(12) United States Patent
Magielse et al.

(10) Patent No.: US 10,970,984 B2
(45) Date of Patent: Apr. 6, 2021

(54) PRESENCE SIMULATION BY MIMICKING LIGHTING SETTINGS AT AN UNOCCUPIED ENVIRONMENT USING LIGHT SETTINGS FROM ANOTHER ENVIRONMENT

(71) Applicant: SIGNIFY HOLDING B.V., Eindhoven (NL)

(72) Inventors: Remco Magielse, Tilburg (NL); Leendert Teunis Rozendaal, Valkenswaard (NL); Daniel Martin Goergen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/304,716

(22) PCT Filed: May 23, 2017

(86) PCT No.: PCT/EP2017/062361
§ 371 (c)(1),
(2) Date: Nov. 27, 2018

(87) PCT Pub. No.: WO2017/207339
PCT Pub. Date: Dec. 7, 2017

(65) Prior Publication Data
US 2019/0295395 A1     Sep. 26, 2019

(30) Foreign Application Priority Data
May 31, 2016  (EP) .................................... 16172066

(51) Int. Cl.
*G08B 15/00*       (2006.01)
*H04L 12/28*       (2006.01)
(Continued)

(52) U.S. Cl.
CPC ........ *G08B 15/002* (2013.01); *H04L 12/2816* (2013.01); *H04L 12/2825* (2013.01);
(Continued)

(58) Field of Classification Search
CPC ............ H05B 37/0272; H05B 37/0227; H05B 37/0245; H05B 37/0281; H05B 37/029;
(Continued)

(56) References Cited

U.S. PATENT DOCUMENTS 9,119,236  B1 *  8/2015  Martin ................... G05B 15/02
2015/0061859  A1    3/2015  Matsuoka et al.
(Continued)

FOREIGN PATENT DOCUMENTS

WO        2015104650 A2      7/2015

*Primary Examiner* — Borna Alaeddini
(74) *Attorney, Agent, or Firm* — Meenakshy Chakravorty

(57) ABSTRACT

A presence mimicking system comprises a first lighting system (1A) arranged to illuminate a first environment and a second lighting system (1B) arranged to illuminate a second environment. A computer system configured to receive from the first lighting system an indication of a sequence of illumination settings, at least some of which have been applied to the first lighting system by at least one user when present in a first environment illuminated thereby. The computer system is configured, in response to a mimic instruction, to mimic in the unoccupied second environment the presence of the at least one user of the first environment, by applying a matching sequence of illumination settings to the second lighting system, wherein the computer system is configured to select the first lighting system for use in the presence mimicking from a set of candidate lighting systems, by comparing a profile of the second lighting system with profiles of the candidate lighting systems.

14 Claims, 3 Drawing Sheets

(51) Int. Cl.
  *H05B 47/105* (2020.01)
  *H05B 47/155* (2020.01)
  *H05B 47/175* (2020.01)

(52) U.S. Cl.
  CPC ......... *H05B 47/105* (2020.01); *H05B 47/155* (2020.01); *H05B 47/175* (2020.01)

(58) Field of Classification Search
  CPC ................ H05B 37/0218; H05B 37/02; H05B 37/0254; H05B 37/0209; H05B 37/0236; H05B 37/0263; H05B 33/0863; H05B 33/0845; H05B 33/0854; H05B 33/08; H05B 33/0857; H05B 33/0866; H05B 41/36; H05B 41/38; H05B 47/105; H05B 47/155; H05B 47/175; G08C 2201/93; G08C 2201/30; G08C 2201/20; G08C 2201/40; G08C 2201/91; G08B 15/002; H04L 12/2816; H04L 12/2825
  See application file for complete search history.

(56) References Cited

U.S. PATENT DOCUMENTS

| | | |
|---|---|---|
| 2015/0160636 A1 | 6/2015 | Mccarthy, III et al. |
| 2015/0161137 A1* | 6/2015 | Lashina ............ G06F 16/24578 707/749 |

\* cited by examiner

PRESENCE SIMULATION BY MIMICKING LIGHTING SETTINGS AT AN UNOCCUPIED ENVIRONMENT USING LIGHT SETTINGS FROM ANOTHER ENVIRONMENT

CROSS-REFERENCE TO PRIOR APPLICATIONS

This application is the U.S. National Phase application under 35 U.S.C. § 371 of International Application No. PCT/EP2017/062361, filed on May 23, 2017, which claims the benefit of European Patent Application No. 16172066.9, filed on May 31, 2016. These applications are hereby incorporated by reference herein.

TECHNICAL FIELD

The present invention relates to presence mimicking, i.e. controlling a lighting system in an unoccupied environment such that, to an external (and potentially nefarious) observer, the environment appears to be occupied.

BACKGROUND

The term "presence mimicking" in the present context means using a lighting system to create the impression of an unoccupied environment (a home in particular) being occupied. That is, automatically applying different lighting settings to the lighting system over time, such that the environment appears to an external observer to be occupied by at least one user (occupant), even though it is not.

Presence mimicking can reduce the chances of someone breaking and entering a user's home, thus providing security. If burglars believe that someone is at home for which lighting provides an important indication they will often not attempt to enter the home. For instance, often burglary occurs during the evening or night, rather than in broad daylight; if the house is completely dark throughout the evening, this indicates absence to the burglars. Thus, mimicking presence by lighting, for example by automatically turning one or more lights on for an interval during the evening, can be an effective way to prevent burglary.

Rudimentary presence mimicking devices, which switch a lamp on and off according to a user-defined schedule have been available for some time. More modern "smart lighting" systems (also known as connected lighting), in which the lighting are controlled using modern network technology (e.g. ZigBee, Bluetooth, Wi-Fi, Ethernet etc.), can provide somewhat more sophisticated presence mimicking. For example, a schedule for the lighting system may be generated based on monitoring actual usage of the lighting system during times when the home is occupied.

SUMMARY

A problem with existing techniques based on schedules whether pre-determined or learnt—is that they can easily be observed over time, i.e. it is easy to distinguish, though observation, schedule-based presence simulation from actual occupancy where a regular schedule is being used. It is possible to randomize such schedules using a suitably programmed computer, but even in that event detectable patterns may still be exhibited. Thus, even randomized patterns may be detectable after a while, i.e. as being simulated patterns rather than actual presence.

What is more, smart systems that learn from a user(s) suffer from a so-called "cold start" problem: they first have to gather information before they can act on their own.

By contrast, the present invention effectively copies, in an unoccupied environment (e.g. home), the behaviour of at least one user when he is occupying a different environment (e.g. a different home).

A first aspect of the present invention is directed to a computer system comprising: a communication interface configured to receive from a first lighting system an indication of a sequence of illumination settings, at least some of which have been applied to the first lighting system by at least one user when present in a first environment illuminated thereby; an input configured to receive a mimic instruction identifying a second environment as unoccupied; and at least one processor configured, in response to the mimic instruction, to mimic in the unoccupied second environment the presence of the at least one user of the first environment, by applying a matching sequence of illumination settings to a second lighting system of the second environment.

This solves the problem of predictability, as the illumination settings that are applied to the second lighting system of the unoccupied second environment correspond to the illumination settings applied by the actual user(s) of the occupied first environment. That is to say, an external observer of the unoccupied environment is effectively seeing the results of an actual user interacting with a lighting system in a normal way (either manually, for example using a light switch or control app, or by triggering one or more occupancy sensors, e.g. motion sensors, located in in the first environment), as the second lighting system is mirroring any illumination changes rendered at the first lighting system in this manner.

Additionally, the present invention is such that it can be implemented to run more-or-less "out-of-the-box", as it does not require any learning phase to be rendered operational. This is in contrast to existing systems that learn schedules though monitoring the behaviour of their own users (note however that the possibility of using some form of learning, in embodiments of the present invention, to subsequently refine the out-of-the-box behaviour is not excluded).

In preferred embodiments, similar users and homes (or other environments) are paired with one another, so that the presence mimicking is based on the behaviour of similar users in similar homes. This provides particularly realistic mimicking of behaviour.

To this end, the at least one processor of the computer system may be configured to select the first lighting system for use in the presence mimicking from a set of candidate lighting systems, by comparing a profile of the second lighting system with profiles of the candidate lighting systems.

The profile of each lighting system may convey one or more of the following elements:
1. a room count,
2. at least one room type,
3. at least one luminaire count,
4. at least one luminaire type,
5. at least one lighting system controller type,
6. a user count,
7. a house type,
8. a neighbourhood profile, or
9. an occupant profile.

Alternatively or in addition, the profile of each lighting system identifies a location of the lighting system. For example, the at least one processor may be configured, in selecting the first lighting system, to determine that a distance between the first and second lighting systems is above a first threshold. E.g. the at least one processor may be configured, in selecting the first lighting system, to determine that the distance between the first and second lighting systems is above the first threshold and below a second threshold.

Alternatively or in addition, the profile of each of the lighting systems may identify at least one usage pattern of the lighting system. For example, the profile may identify at least two usage patterns for different days of the week.

The at least one processor may be configured to determine a geo-separation metric for the first and second environments (e.g. a time zone difference between the first and second lighting systems), and the matching sequence of illumination settings being delayed to account for the geo-separation metric.

Each of the at least some illumination settings (e.g. each of the illumination settings in the sequence of illumination settings) may have been applied manually by the at least one user whilst in the first environment or by the at least one user triggering an occupancy sensor of the first environment whilst in the first environment.

A second aspect of the present invention is directed to a presence mimicking system comprising: a first lighting system arranged to illuminate a first environment; a second lighting system arranged to illuminate a second environment; a computer system configured to receive from the first lighting system an indication of a sequence of illumination settings, at least some of which have been applied to the first lighting system by at least one user when present in the first environment; and an input configured to receive a mimic instruction identifying the second environment as unoccupied; wherein the computer system is configured, in response to the mimic instruction, to mimic in the unoccupied second environment the presence of the at least one user of the first environment, by applying a matching sequence of illumination settings to the second lighting system.

In embodiments, the presence mimicking system may comprise a sensor system located to monitor the second environment, and configured to instigate the mimic instruction automatically upon sensing that the second environment is unoccupied.

A third aspect of the present invention is directed to a computer-implemented presence mimicking method, the method comprising implementing by a computer system the following steps: receiving from a first lighting system an indication of a sequence of illumination settings, at least some of which have been applied to the first lighting system by at least one user when present in a first environment illuminated thereby; receiving a mimic instruction, which identifies a second environment as unoccupied; and in response to the mimic instruction, applying a matching sequence of illumination settings to a second lighting system of the unoccupied second environment, so as to mimic therein the presence of the at least one user of the first environment.

In embodiments of the second and third aspects, any feature of the first aspect or any embodiment thereof may be implemented.

A fourth aspect of the present invention is directed to a computer program product comprising code stored on a computer readable storage medium and configured when executed to implement the method of the third aspect or any embodiment thereof.

BRIEF DESCRIPTION OF FIGURES

For a better understanding of the present invention, and to show how the same may be carried into effect, reference is made to the following figures in which.

DETAILED DESCRIPTION OF EXAMPLE EMBODIMENTS

Figure 1:
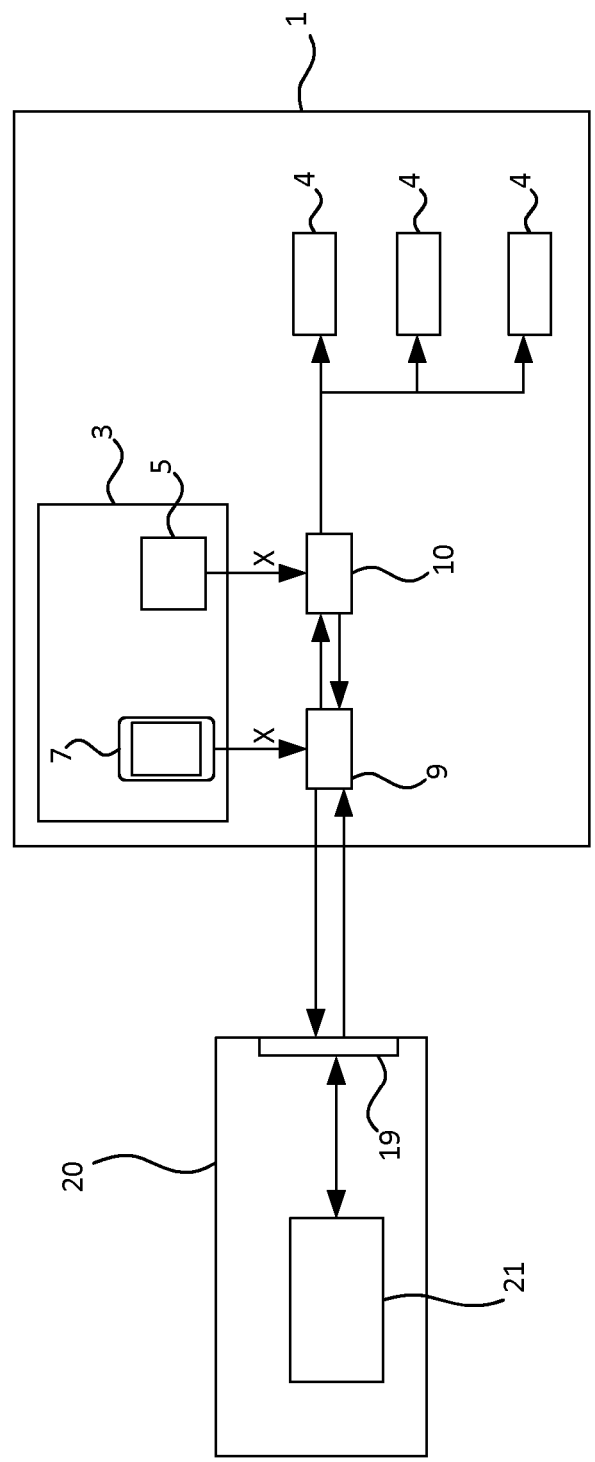
FIG. 1 shows a schematic block diagram of part of a presence mimicking system.

FIG. 1 shows a schematic block diagram of part of a presence mimicking system, which comprises a lighting system 1 and a computer system 20.

Figure 2:
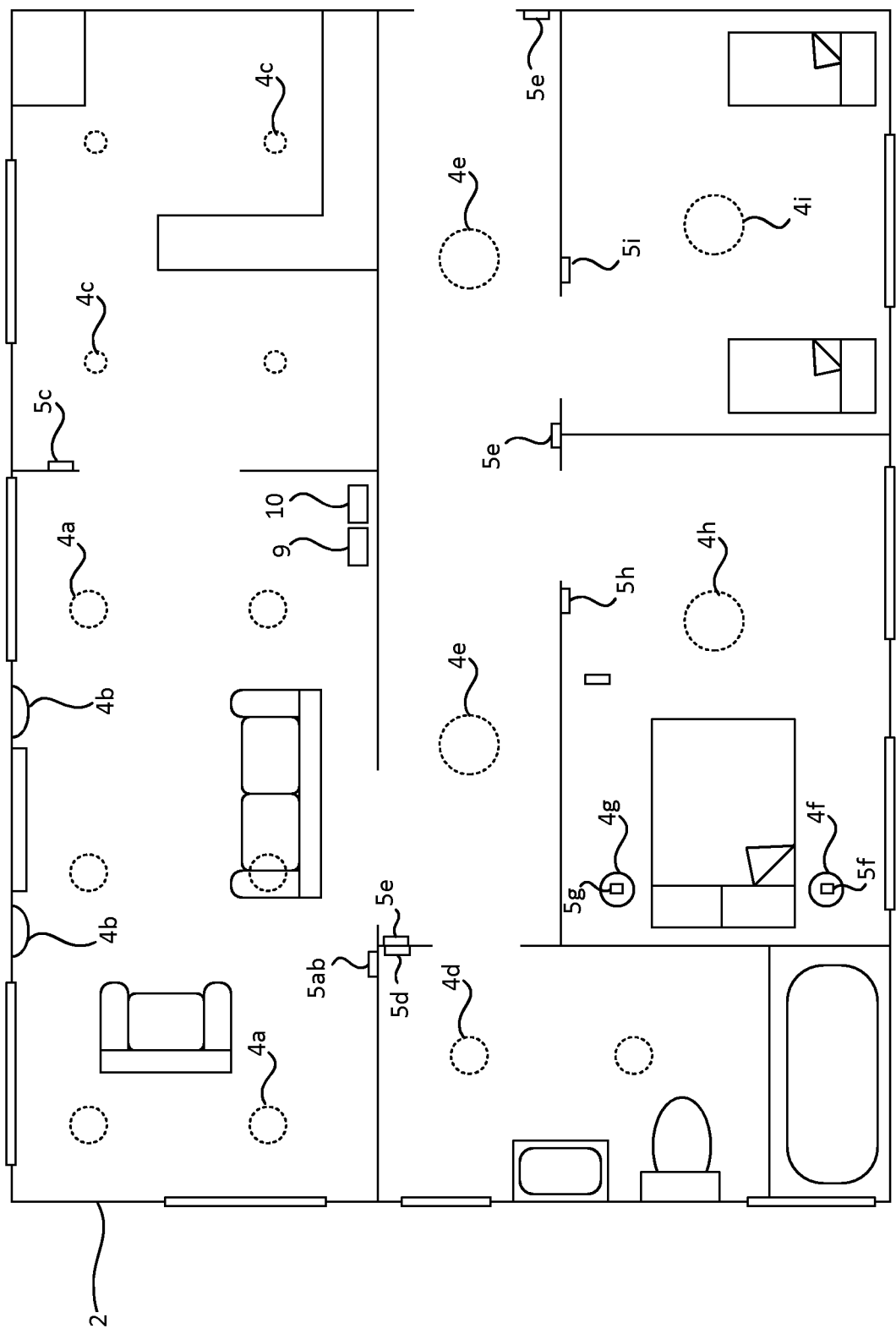
FIG. 2 shows a schematic plan view of an environment, in which a lighting system is installed.

The lighting system 1 comprises a plurality of luminaires 4 arranged to selectively emit light in order to illuminate an environment (2, FIG. 2). Each of the luminaires 4 comprises at least one respective light emitting device such as an LED-based lamp, gas-discharge lamp or filament bulb, plus any associated housing or support. Each of the luminaires 4 may take any suitable form such as a ceiling or wall mounted luminaire, a free standing luminaire (e.g. table lamp, desk lamp or floor lamp etc.), a wall washer, or a less conventional form such as an LED strip, a luminaire built into a surface or an item of furniture, or any other type of illumination device for emitting illumination into the environment 2 so as to illuminate the environment 2.

The lighting system 1 also comprises manual lighting control apparatus 3 for manually controlling the luminaires 4 i.e. which can be used by a user occupying the environment 2 to apply illumination settings to the luminaires 4. In the simplest case, these are straightforward on/off settings. However, using the lighting control apparatus 3 it may in some case be possible to apply more sophisticated illumination settings such as dimming settings, to vary the luminous intensity of the emitted light; colour settings, to vary one or more colour characteristics of the emitted light; or directionality settings, e.g. to a beam width or beam direction of the emitted light.

The luminaires 4 are independently controllable, at least to some extent. The lighting system 1 may be configured such that Illumination settings can be applied to at least one luminaires 4 individually, i.e. independently of any other luminaire; and in some cases, the luminaires 4 may be fully independent (i.e. such that any one of the luminaires 4 can be controlled independently of the rest). Alternatively or in addition, the lighting system may be configured such that the same illumination settings can be applied to sets of two or more of the luminaires 4, e.g. a single switch may turn the set on or off independently of the remaining luminaires. In some cases, this may be the only way to control that set of luminaires (i.e. it may not be possible to use the control apparatus 5 to control a luminaire in a given set independently of the rest of that set); though in other cases, it may be possible to both to apply the same illumination settings to a whole set of luminaires simultaneously, but also to independently control the luminaires within that set should the user wish to do so.

The lighting control apparatus 3 may for example comprise at least one dedicated lighting control device 5, such as a wall panel, e.g. comprising at least one switch such as an on/off switch or dimmer switch; a remote control, for example an infrared or RF (radio frequency) remote control; or a switch that is part of one of the luminaires 4 itself.

The lighting control apparatus 5 may also (or alternatively) comprise at least one general purpose user device 7, for example a computer device such as a smartphone, smartwatch, tablet device, laptop computer, or other form of mobile device; or a desktop computer, or other form of fixed device etc. The user can use such a device to control the lighting device using an input device of the user device 7, for example a touchscreen, mouse, trackpad, audio input device (to provide voice input), image capture device or other optical sensor (to provide gesture control) etc. The lighting control apparatus 5 can also comprise other types of device, such as a dedicated voice input device, which may for example be part of a general smart-home control system.

Each device 5, 7 of the lighting control apparatus 3 is referred to generally as a lighting system controller herein. The lighting control apparatus 3 can comprise different types of lighting system controller, e.g. fixed control devices (e.g. wall panel, fixed computer device), portable control device (e.g. dedicated remote control, generic mobile device). A control event "X" denotes a usage of the lighting control apparatus 3 to apply at least one illumination setting to at least one of the luminaires 4, thereby causing a change in at least one characteristic of light emitted by the at least one luminaire 4 of the lighting system.

In this example, the lighting control apparatus 3 communicates with the luminaires 4 via a central control node 10, sometimes referred to as a bridge. The bridge 10 is connected to each of the luminaires 4 such that it can transmit control signals to that luminaire. Communication between the bridge 10 and the luminaires 4 can be effected using wireless technology (e.g. ZigBee, Bluetooth, Wi-Fi), wired technology (e.g. Ethernet, DMX) or a combination of wired and wireless technology. An example of a suitable bridge is the Philips Hue Bridge, which is based on wireless ZigBee technology.

In this manner, the luminaires 4 and the bridge 10 form a lighting network, to which the bridge 10 functions as a network gateway. The lighting network can have any suitable topology, for example data may be relayed between the gateway 10 and some of the luminaires 4 via other luminaires 4 of the lighting system 10; or alternatively, the data may communicated between the gateway 10 and every luminaire 4 directly (i.e. without such relaying via other luminaires 4).

A lighting system providing advanced control such as this is sometimes referred to as a "connected lighting" system.

A second network node 9 is shown, via which the user device 7 communicates with the bridge 10. Communication between the second node 9 and the user device 7 may also be effected using wireless technology (e.g. Wi-Fi) or wired technology (e.g. Ethernet), e.g. via a local area network (e.g. TCP/IP network). For example, the second node 9 may comprise a router (e.g. TCP/IP router), to which both the user device 7 and the gateway 10 are connected. In the case that communication between the bridge 10 and the luminaires 4 uses a different network technology (e.g. ZigBee), the bridge 10 functions as a network gateway by translating between the two protocols.

This is just one example, and alternative lighting system architectures are within the scope of the present disclosure. For example, the user device 7 may communicate with the bridge 10 directly instead, e.g. via Bluetooth. As another example, some or all of the lighting control apparatus 3 may communicate with the luminaires 4 directly, e.g. via Bluetooth or Wi-Fi, which does not require a bridge 10.

The second network node 9 also comprises a modem (where the modem and the router may be integrated in the same device, or in separate, connected devices of the second node 9). The modem is configured to connect to an external data network, such as the Internet. This, in turn, allows data to be communicated between the lighting system 1 and the external data network, via the modem of the second node 9, thereby connecting the lighting system 1 to the external data network.

This allows the lighting system 1 to communicate with the computer system 20, which is also connected to the external data network. This allows lighting system 1 to indicate to the computer system 20 what illumination settings are currently being manually applied to the lighting system 1 in real-time or near-real-time (when the environment 2 is occupied), and to receive illumination settings to be automatically applied to the lighting system 1 under the control of the computer system 20 in real-time or near-real-time (when the environment 2 is occupied). It also allows the lighting system 1 to transmit a lighting system profile 22 to the computer system 20, details of which are described below.

The computer system 20 comprises a communication interface 19, which is a network interface via which it connects to the external data network for communicating with the lighting system 1, and at least one processor 21 connected to the communication interface 19. The at least one processor 21 is configured to execute lighting system management code i.e. the computer system 20 comprises a single processor 21 configured to execute the lighting system management code, or multiple processors 21 each configured to execute a respective portion of the lighting system management code. In the case of multiple processors, these may be part of the same device (e.g. a server device) or they may be part of difference devices (e.g. two or more interconnected server devices, which may or may not be spatially located, e.g. which may be in the same or different datacentres). For example, the computer system 20 may be part of a cloud computing system ("cloud"), wherein at least one virtual machine runs on each processor 21 of the computer system 20, and the lighting system management code 20 run on the virtual machine(s).

Whether it is formed of one or multiple server devices, the computer system 20 operates as a server to implement the functionality of the lighting system management code.

FIG. 2 shows a plan view of an environment 2 in which the lighting system 1 is installed. The example environment 2 is a home, e.g. a house or flat, or part of such a home.

The environment 2 comprises multiple rooms, namely a living room and adjacent kitchen to the top of FIG. 2; a bathroom to the left; two bedrooms (master and twin) towards the bottom; and a central hallway connecting all of these rooms, with entrances connecting the living room, bathroom, and two bedrooms to the hallway directly. A number of control devices 5ab, 5c, . . . , 5i of the lighting control apparatus 3 are shown located at various placed in the environment: control devices 5g and 5f are switch units integrated in luminaires 4g and 4f, which are bedside lamps located in the master bedroom; the remaining control devices are wall panels, mounted at various locations in the environment 2.

The living room comprises two sets of luminaires: ceiling-mounted luminaires 4a, and wall washers 4b. These two sets are independently controllable via wall-panel 5ab located on a wall of the living room, i.e. illumination settings can be applied to the ceiling luminaires 4a and wall washers 4b independently of each other, using wall panel 5ab. In the simplest case, this means they can be switched on and off independently of each other; in more sophisticated lighting systems, it may also be possible to adjust their respective dimming settings and/or colour settings independently, and in some cases may also exert a level of independent control within each set of luminaires (e.g. tune the colour of one of the ceiling luminaires 4a independently of the other ceiling luminaires 4a). Luminaires 4c in the kitchen can be controlled via wall panel 5c on a kitchen wall. In the hallway, three wall panels 5e are shown, located near the entrances to the living-room and each of the bedrooms, any one of which can be used to control luminaries 4e located in the hallway. Likewise, wall panels 5d, 5h, 5i are located in the bath room, master bedroom and twin bedroom respectively, for controlling luminaires 4d, 4h, 4i located in those rooms respectively.

All of the luminaires 4a, . . . , 4i and control devices 5ab, . . . , 5i are connected to the bridge 10, which happens to located in the living room in this example. Thus the bridge 10 knows what illumination settings have been applied to any one of the sets of luminaires 4a, . . . , 4i, and which of the control devices 5ab, . . . , 5i has been used to apply those settings. These data provide a rich source of occupancy information pertaining to the environment 2, and can for example be used to infer (or at least estimate) a number of current occupants of the environment 2, and which of the rooms is currently occupied, based on the manner in which lighting settings are applied within the environment 2. When built up over time, this information can be used to determine information about occupancy patterns and patterns of lighting system usage by the occupant(s) (which may vary e.g. between work days and weekends, depending on the activity of the occupants).

The occupancy information that is available at the bridge 10 is used to generate the lighting system profile 22. The profile may be generated by the bridge 10 itself, e.g. by profile generation code executed on a processor of the bridge; or alternatively, it may be generated by a separate device connected to the bridge 10, such as user device 7, e.g. by a suitable application executed on a processor of the user device 7. For example, the profile generation functionality may be incorporated into a control application that is used to control the luminaires 4, or it may be provided in a separate application executed on the user device 7. Alternatively, the profile generation functionality may be implemented across multiple devices, e.g. with part being implemented at the bridge 10 and a part at the user device 7. As another example, at least some of this functionality may be implemented by one of more of the luminaires 4 themselves and/or by one of the control devices 5.

Figure 3A:
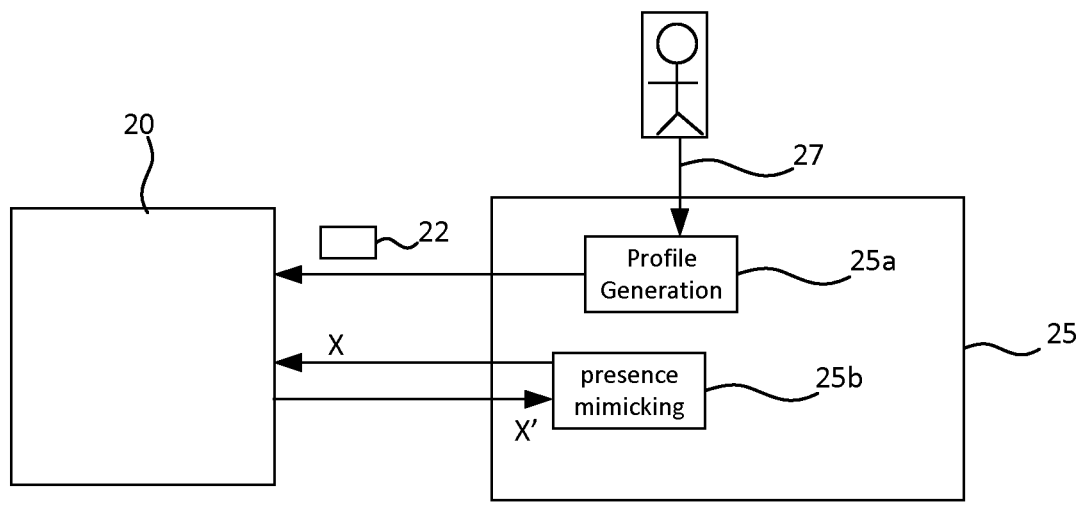
FIG. 3A shows certain functional modules of a lighting system.

FIG. 3A shows a local control system 25, which represents functionality that is implemented by the lighting system 1, for example by the bridge 10, user device 7, one or more of the control device(s), one or more of the luminaire(s) or by a combination of two or more such devices etc. (in other cases, at least part of this could be implemented externally, e.g. in the cloud). This functionality is preferably implemented in software, i.e. by local control code executed on at least one processor of the lighting system 1, for example a processor of bridge 10, user device 7, luminaire(s) 4 or control device(s) 5. The code may be distributed, i.e. different parts executed on different processors, e.g. of different devices (e.g. part may be executed on bridge 10 and part on user device 7 and/or luminaire(s) 4 and/or control device(s) 5 etc.). Various functional modules 25a, 25b of the local control system 25 are shown, which represent respective parts of this functionality (where that part may be implemented at a single device of the lighting system 1, or distributed across two or more devices of the lighting system 1).

The profile generation functionality of the lighting system 1 is represented by a profile generation module 25a of the local control system 25.

The lighting system profile 22 conveys information about the nature of the environment 2 and the setup of the lighting system 1, for example:

- A number of rooms in which the lighting system 1 is installed, i.e. a room count
- A room type for each of the room(s);
- A number of luminaires, i.e. a luminaire count; for example a luminaire count for each of the rooms(s)
- A type of each of the luminaires 4 (or of each set of luminaire)
- Information about the connections between luminaires 4 and control devices 5, i.e. which lights 2 are connected to (and controlled from) which switch, etc.
- Information about the lighting control apparatus 3, e.g. a type of each lighting system controller (in particular, whether it is fixed or portable);
- A number of users living in the home, i.e. a user count.

The profile 22 also conveys information about usage of the lighting system 1 by the occupants of the environment 2, for example:

1. Information about when different luminaires 4 are used at different times of day (day/evening/night etc.), and on different types of day (weekday/weekend etc.) and in which setting.
2. Usage patterns for each set of luminaires (e.g. 4a, 4b, 4c etc.) between different days;
3. Information about related use of different luminaires, e.g. which luminaires (or which set of luminaires) are typically on together. For example, information about correlations between illumination settings applied to (say) the living room luminaires 4a/4b and the kitchen luminaires 4c or hallway luminaires 4e.
4. Information about sequences that are typically followed i.e. correlations between the usage of different set of luminaires. For example, certain recurring sequences of control events may be identified: as an example, an occupant may occupy the living room for a certain amount of time in the evening. Upon going to bed, the occupant may regularly perform similar control actions e.g. turn off the living room luminaires 4a/4b, turn on the hallway lights 4e using the controller 5e adjacent the living room door, and turn on the bathroom lights 4d; then a short time later, he may turn off the bathroom lights, turn of the hallway lights using the controller 5e adjacent the door to the master bedroom and briefly turn on one or more of the master bedroom lights 4h, 4f, 4g before turning them off for the night. This allows homes and lighting systems with historically similar lighting systems to be paired for the purpose of distributed presence mimicking (see below).

Whilst in the described examples this information is derived locally, some or all of it and in particular the aggregated/interpreted information of items 3 and 4 could alternatively be derived by processing data performed externally 20 at computer system 20, e.g. in the cloud processing rather than in the home).

The generated profile 22 also includes an occupancy flag, which a user can set to indicate whether or not the environment 2 is currently occupied (in other embodiments, it can be derived automatically based on presence detection see below). When the occupancy flag is set to unoccupied in the profile 22, this can act as an instruction to the server 20 to perform presence mimicking (mimic instruction), by mirroring control actions performed in a different and currently occupied environment. This is referred to herein as "distributed presence mimicking", and is described in further detail below.

The generated profile 22 is communicated to the server 20 via the second network node 20, which also happens to be located in the living room in this example.

As noted, a user device 7 may also be used to control the luminaires 4 via bridge 10 in the manner described above Although not shows in FIG. 2, one or more sensors may be arranged in the environments 2, to provide additional occupancy information that can be used by the profile generation module 25a in generating the lighting system profile 22.

In addition, a user may be able to manually set some of the information in the profile 22, for example he may select:
- a set of personas fitting his family so that homes in which similar families live (e.g. similar number of children/adults of similar ages or other similar family characteristics etc.) can be paired for distributed presence mimicking) or other type of family profile, or more generally an occupant profile;
- a home type, so that similar homes can be paired; and/or
- a neighbourhood profile (so that homes in similar neighbourhoods can be paired).

As will be appreciated, the room layout and lighting system arrangement of FIG. 2 is purely exemplary, and alternative layouts and arrangements are within the scope of this disclosure.

The server 20 receives such lighting system profiles 24 from multiple lighting systems, which it uses to identify matching pairs of lighting systems, one of which is then configured to mirror the other.

Whilst it is generally preferred for the profile 22 to be generated at the lighting system 1 and communicated to the server 20 (as this reduces the processing load placed on the server), in some implementations the profile 22 may be generated at least in part at the server 20, based on raw data transmitted from the lighting system 1.

Figure 3B:
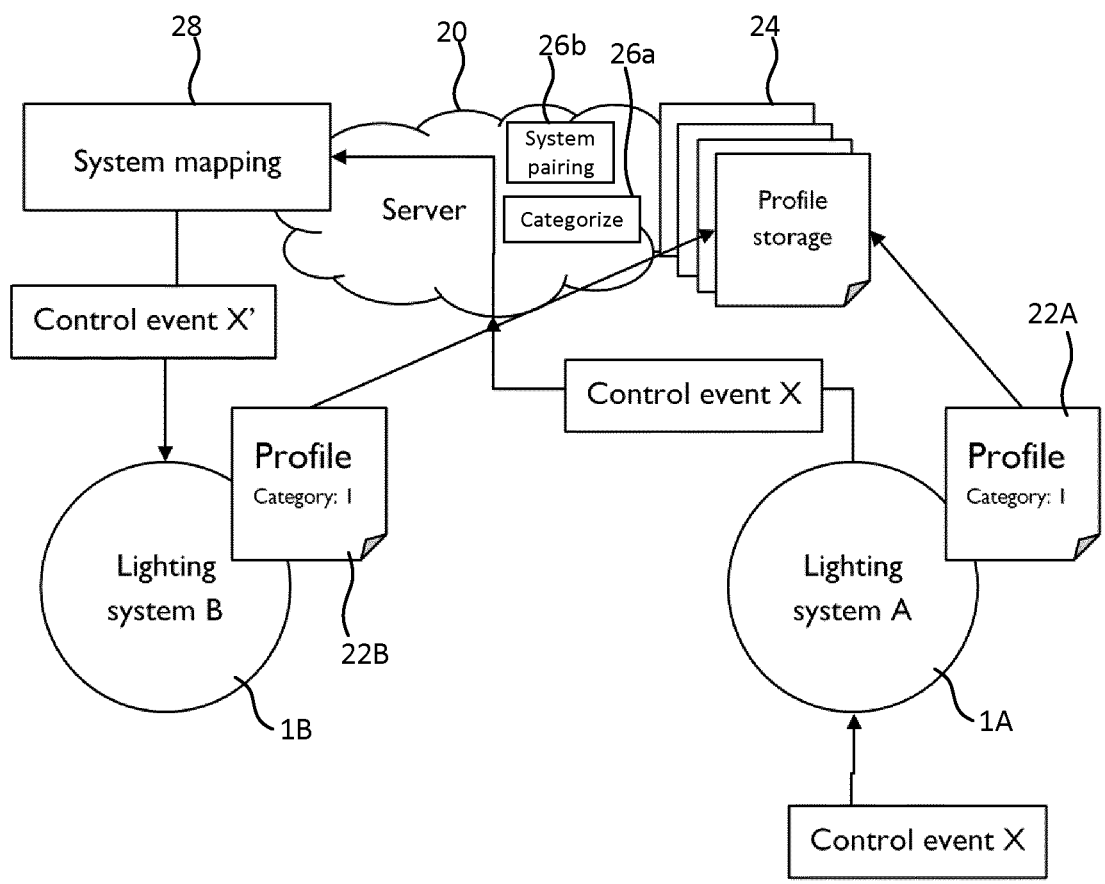
FIG. 3B shows a functional block diagram representing functionality implemented by a presence mimicking system.

As indicated in FIG. 3B, the server 20 collects all of the profiles of all lighting systems, and stores them in a profile repository 24. The profile repository 24 can be implemented at the physical level using any form of computer readable electronic storage, using a computer storage device or multiple storage devices (which may be collocated, or geographically distributed); for example using one or more magnetic storage devices and/or one or more solid state storage devices.

A profile categorization module 26a, a system pairing module 26b are shown and a system mapping module 28 of the server 20 are shown, each of which represents part of the functionality implemented by the lighting system management software running at the server 20.

The profile categorization module 26a assigns a category to each of the profiles, such that similar lighting system profiles are assigned to the same category.

A user can put his lighting system 1 into a mimic presence mode, by way of a suitable user input 27 at the lighting system 1 e.g. using user device 7. This causes the profile generation module to set the occupancy flag in the profile 22 to unoccupied. The updated occupancy flag is communicated to the server 20. The flag may, for example, be updated by updating a home/away setting stored at the bridge 10, using an application executed on user device 7 or alternatively it could be triggered by a partner device coupled to the bridge 10, e.g. part of another smart-home control system (for example, a smart-heating control device, such as Nest).

Alternatively, in some cases, it may be possible for the lighting system 1 to be put into the presence mimic mode automatically, based on "geo-fencing", i.e. such that when user is detected to have left the environment 2, it is enabled automatically and when he returns home, it is disabled automatically. This can be implemented using a suitable sensor or sensors, e.g. optical or audio sensors to detect the presence of the user, or a wireless receiver that is used to track (say) the location of the user's phone.

By way of example, FIG. 3B shows a first and a second such lighting system profile 22A, 22B of a first and second such lighting system 1B respectively, each installed in a different environment (e.g. different homes). The occupancy flag of the second profile 22B is set to unoccupied, thereby marking the second lighting system 1B in the repository 24 as instructed to "mimic presence".

The system pairing module 26a detects this, and in response searches the profiles held in the repository 24 for a profile 22A of a similar lighting system (which is the first lighting system 1A), for example for a profile 22A in the same, or a related category as the first profile 22A, and which is not marked as "mimic presence" in the repository 24, i.e. whose occupancy flag is set to occupied. The searched profiles in the repository 24 are referred to as candidate lighting system profiles in this context.

When located, this first profile 22A is selected for use in the distributed presence mimicking that is applied to the first second system 1B, thereby pairing the first and second lighting systems 1A, 1B with one another.

For as long as the occupancy flag in the first profile 22A remains set to unoccupied, all manual lighting control events "X" that are performed at the first lighting system 1A—i.e. by at least one occupant of a first environment (e.g. first home) in which it is installed—are mapped to the second lighting system 1B. That is, for each lighting control event X that is effected manually at the occupied first lighting system 1A, the system mapping module 28 effects a matching lighting control event X' at the second lighting system 1B automatically.

As multiple control events X are effected manually over time at the first lighting system 1A, i.e. as a sequence of illumination settings is manually applied over time at the first system 1A (causing a sequence of changes in at least one characteristic of light emitted by the first system 1A), this causes a matching sequence of illumination settings to be applied automatically to the second lighting system 1B (causing a sequence of matching changes in at least one corresponding characteristic of light emitted by the second lighting system 1B).

In this respect, the relevant functionality of the lighting system 1 is represented by a presence mimicking module 25b of the local control system 25. When operating the presence mimicking mode (when the environment 2 is unoccupied), the presence mimicking module 25b receives the matching control events X' from the server 20, and applies them to the lighting system 1. When operating in manual mode (when the environment 2 is occupied by at least one user), the presence mimicking module 25b transmits to the server 20 an indication of control events X applied manually at the lighting system 1 in real-time or near-real-time, i.e. as they are applied, such that there is only a short delay (e.g. of order seconds or minutes) between a control event X being applied at the lighting system 1 and an indication of that control event X being communicated to the server 20.

In some cases, the system mapping module 28 may adapt the control events X to account for differences between the first and second lighting systems 1A, 1B. For example: if at the first lighting system 1A an occupant switches on three lights in the living room, and the second lighting system 1B has five lights in the living room, then illumination settings applied manually to the three lights of the first lighting system 1A may be applied automatically to the five lights in the living room of the second lighting system 1B. These differences between the lighting systems 1A, 1B are determined by the system mapping module 28 using their profiles 22A, 22B.

The second lighting system 1B responds to the matching control event X' from the server 20 in the same way that it would respond to a control event X instigated manually using the local lighting control apparatus 3. For example, the matching control event X' may be received at the bridge 10 and applied to one or more of the luminaires 4, e.g. via ZigBee, or by a device of the lighting control apparatus 3, and applied by that device (e.g. via the bridge 10, or directly to one or more of the luminaires 4 via e.g. Wi-Fi or Bluetooth).

For the avoidance of doubt, it is emphasised that control events X are not only indicated to the server 20 by the first lighting system 1A, but are actually applied at the first lighting system 1A in a normal manner. That is, the sequence of illumination settings applied at the first lighting system 1A actually causes at least one characteristic of light emitted by the luminaire(s) of that first lighting system 1A to be varied as desired by the occupant(s) of the first environment 1A.

In some cases, the system mapping module 28 may time shift the matching control event X' relative to the corresponding control event X, in order to account for a geo-separation of the first and second lighting systems 1A and 1B, based on a geo-separation metric computed by comparing their profiles 22A, 22B. A geo-separation means a spatial separation large enough that sunrise and/or sunset times are noticeably different at the two lighting systems. For example, the two lighting systems may be in different time zones. This may mean that control events X that happen at 16.00 in one geolocation (of first lighting system A), will not be performed instantly at second lighting system 1B, but will only occur when the geo location of second lighting system 1B is at the same time in its own time zone i.e. 16.00 local time (which may be one or more hours later).

In pairing occupied and unoccupied lighting system profiles, the pairing process implemented by the system pairing module 26b may be biased so as to avoid pairing lighting systems that have the same (or approximately the same) geolocation: generally, it is undesirable to mimic the lighting pattern of an immediate neighbour, as an external observer may be able to see a correlation in the illumination settings being applied to neighbouring homes, and deduce that one is mirroring the other. However, another consideration is that similar geolocations may share the same cultural background and it may therefore be preferred to pair lighting systems of households that are relatively nearby. Thus preferably the pairing module 26b pairs lighting systems that are separated by a distance above a first threshold but below a second threshold. Note, these thresholds may vary as a function of angle, so as to correspond to non-circular spatial boundaries (e.g. so as to correspond to structure within a city, city or country borders etc.).

Once the user returns home he can remove his system from the "mimic presence" mode, by setting the occupancy flag in the profile 22B to occupied. The updated flag is communicated to the server 20, so that the second lighting system 22B is no longer marked in the profile repository 24 as unoccupied.

Note, the terms "luminaire", "light source", "light" (when referring to a device) and "illumination source" are used interchangeably, to refer to a device which emits not just any light, but specifically illumination, i.e. light on a scale suitable for contributing to the illuminating of an environment occupied by one or more humans (so that the human occupants can see within the physical space as a consequence). A basic luminaire may consist simply of a light bulb or bulbs (e.g. LED, a filament bulb or gas-discharge lamp) and any associated support structure. Other luminaires may also comprise, for example, an associated casing or housing though others may not. A luminaire can take the form of a traditional ceiling or wall mounted room luminaire, or free standing luminaire (such as a floor or table lamp); or it may take a less traditional form such as an LED-strip embedded in a surface or item of furniture, a wall washer, or any other form of illumination device adapted to provide illumination specifically. Components for communicating with the bridge 10 and/or lighting control apparatus 3 (e.g. dedicated application-specific circuity, FPGA, processors and accompanying software (e.g. firmware) as applicable) may be incorporated in a light bulb with a standard fitting, to allow easy retrofitting of connected lighting functionality into existing, non-specialised lighting systems. However, this is not essential and in general these communication components can be incorporated at any suitable location in the lighting system to allow communication between the luminaires and the controller.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

Note that where the claims recite "at least one processor" configured to implement certain functionality, this covers not only a scenario where one processor is configured to implement all of this functionality, but also a scenario in which there are multiple processors, each of which is configured to implement only a part of this functionality, such that this functionality as a whole is implemented by the multiple processors collectively. Where there are multiple processors, these may or may not be geographically distributed (e.g. they may be in the same datacentre, or distributed across two or more datacentres).

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer system comprising:
a communication interface configured to receive from a first lighting system an indication of a sequence of illumination settings, wherein at least some of the illumination settings have been applied to the first lighting system by at least one user when present in a first environment illuminated by the first lighting system;
an input configured to receive a mimic instruction identifying a second environment as unoccupied; and
at least one processor configured to:
select the first lighting system from a set of candidate lighting systems by comparing a profile of a second lighting system with profiles of the candidate lighting systems; and
mimic, in response to the mimic instruction, the presence of the at least one user of the first environment in the unoccupied second environment, by applying a matching of the sequence of illumination settings to the second lighting system of the second environment,
wherein the at least one processor is further configured to disqualify at least one candidate lighting system from the set of candidate lighting systems from being selected in response to determining that a distance of the at least one candidate lighting system to the second lighting system is less than a first distance denoted by a first threshold, and
wherein the application of the at least some of the illumination settings to the first lighting system illuminating the first environment is simultaneous with the application of the matching of the sequence of illumination settings to the second lighting system of the second environment.

2. The computer system according to claim 1, wherein the set of candidate lighting systems is user selectable.

3. The computer system according to claim 2, wherein the profile of each respective lighting system identifies a location of the respective lighting system.

4. The computer system according to claim 2, wherein the profile of each respective lighting system identifies at least one usage pattern of the respective lighting system.

5. The computer system according to claim 4, wherein the profile of each respective lighting system identifies at least two usage patterns for different days of the week.

6. The computer system according to claim 1, wherein the profile of each respective lighting system of the set of candidate lighting systems conveys:
a room count,
at least one room type,
at least one luminaire count,
at least one luminaire type,
at least one lighting system controller type,
a user count,
a house type,
a neighborhood profile, or
an occupant profile.

7. The computer system according to claim 1, wherein the at least one processor is configured, in selecting the first lighting system, to determine that the distance between the first and second lighting systems is below a second threshold.

8. The computer system according to claim 1, wherein the at least one processor is configured to determine a geo-separation metric for the first and second environments, the matching sequence of illumination settings being delayed to account for the geo-separation metric.

9. The computer system according to claim 8, wherein the geo-separation metric is a time zone difference between the first and second lighting systems.

10. The computer system according to claim 1, wherein each of the at least some of the illumination settings has been applied manually by the at least one user whilst in the first environment or by the at least one user triggering an occupancy sensor of the first environment whilst in the first environment.

11. A presence mimicking system comprising:
a first lighting system arranged to illuminate a first environment;
a second lighting system arranged to illuminate a second environment;
a computer system configured to receive from the first lighting system an indication of a sequence of illumination settings, wherein at least some of the illumination settings have been applied to the first lighting system by at least one user when present in the first environment; and
an input configured to receive a mimic instruction identifying the second environment as unoccupied;
wherein the computer system is configured to:
select the first lighting system from a set of candidate lighting systems by comparing a profile of the second lighting system with profiles of the candidate lighting systems; and
mimic, in response to the mimic instruction, in the unoccupied second environment the presence of the at least one user of the first environment by applying a matching sequence of illumination settings to the second lighting system,
wherein the computer system is further configured to disqualify at least one candidate lighting system from the set of candidate lighting systems from being selected in response to determining that a distance of the at least one candidate lighting system to the second lighting system is less than a first distance denoted by a first threshold, and
wherein the application of the at least some of the illumination settings to the first lighting system illuminating the first environment is simultaneous with the application of the matching sequence of illumination settings to the second lighting system illuminating the second environment.

12. The presence mimicking system according to claim 11, comprising a sensor system located to monitor the second environment, and configured to instigate the mimic instruction automatically upon sensing that the second environment is unoccupied.

13. A computer-implemented presence mimicking method, the method comprising implementing by a computer system the following steps:
receiving from a first lighting system an indication of a sequence of illumination settings, wherein at least some of the illumination settings have been applied to the first lighting system by at least one user when present in a first environment illuminated by the first lighting system;
receiving a mimic instruction, which identifies a second environment as unoccupied;
selecting the first lighting system from a set of candidate lighting systems, by comparing a profile of a second lighting system with profiles of the candidate lighting systems; and
in response to the mimic instruction, applying a matching sequence of illumination settings to the second lighting system of the unoccupied second environment, so as to mimic in the second environment the presence of the at least one user of the first environment, wherein the method comprises disqualifying at least one candidate lighting system from the set of candidate lighting systems from being selected in response to determining that a distance of the at least one candidate lighting system to the second lighting system is less than a first distance denoted by a first threshold, and wherein the application of the at least some of the illumination settings to the first lighting system illuminating the first environment is simultaneous with the application of the matching sequence of illumination settings to the second lighting system of the unoccupied second environment.

14. A non-transitory computer readable medium comprising program code stored on the medium, wherein the code, when executed by one or more processors, is configured to cause said one or more processors to implement the method of claim 13.

* * * * *